United States Patent Office 3,452,085
Patented June 24, 1969

3,452,085
ALPHA-(5-INDANYL)-BUTYRIC ACID
Francesco Lauria, Pier Nicola, Giraldi, Pier Nicola Francavilla, Giuliano Nannini, and Willy Logemann, Milan, Italy, assignors to Carbo Erba S.p.A., Milan, Italy, a corporation of Italy
No Drawing. Filed Feb. 11, 1966, Ser. No. 526,705
Int. Cl. C07c 63/00; C07d 5/32, 21/00
U.S. Cl. 260—515        1 Claim

ABSTRACT OF THE DISCLOSURE

Indanyl-substituted butyric acids and benzofuryl-substituted butyric acids are disclosed. The acids are produced by converting the chloromethyl derivative of the indanyl or benzofuryl compound into the corresponding nitriles by reaction with a cyanide, thereafter the nitrile is alkylated with alkyl-halogenides and the resulting compounds are converted into the desired acids by saponification with inorganic bases. The acids have high choleretic activity.

---

This patent relates to preparation of acids with following general formula:

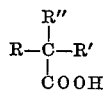

where:

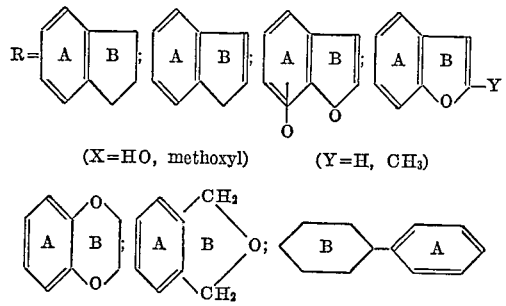

R can be locked both in ring A and in ring B
R'=alkyl group ($C_1$ to $C_4$)
R''=R' or H The compounds can be prepared starting from chlormethyl-derivatives, which are converted into the corresponding nitriles, then by means of alkyl-halogenides are either mono- or dialkylated.

The compounds thus obtained are converted into acids by saponification. Some compounds have been prepared through following stages: Friedel-Crafts with oxalyl-monochloride, Grignard with the corresponding alkyl-group which is to be introduced, and finally by dehydration of the hydroxy-group with simultaneous reduction.

The acids thus obtained can be salified with inorganic bases (for example NaOH, KOH, Ca(OH)$_2$) or with an organic base (for example glucosamine, amino-glycerine, morpholine etc.).

Some of these compounds show a good choleretic activity. The choleretic activity has ben tested in rats, by oral route, by measuring of the biliary flow for a total period of four hours. The table shows the maximum choleresis peaks, i.e. the absolute maximum increase in 100 ml./h. towards the basic biliary flow, of the acid, for instance α-(5-indanyl)-butyric acid in comparison with the known dehydrocholine.

Also the quantity of bilirubine has been calculated, as excreted at the moment of highest choleresis per hour, for a dosage of 10 mg./100 g. body weight of rat. The variation has been in the order of +101.9 for α-(5-indanyl)-butyric acid, whilst it has amounted to +49.1 for dehydrocholine.

It is clearly apparent from the above mentioned data that the choleretic activity of α-(5-indanyl)-butyric acid is remarkably higher than that of dehydrocholine. The following examples illustrate but do not limit this invention.

EXAMPLE 1

α-(5-indanyl)-butyric acid (a) The mixture containing indane (115 g.), trioxymethylene (56 g.), icy acetic acid (128 ml.) and 99% phosphoric acid (82 ml.; d.=1.85 ml.) is added with 37% conc. hydrochloric acid (200 ml.) and stirred for 24 hours at 58–60° C., then diluted with ice water and extracted with ether (200 ml.×3), eventually washed with saltwater, dried and evaporated. Distillation of the oily residue results in 100 g. 5-chloromethyl-indane (boiling point; 86° C./0.8).

(b) The KCN solution (51 g.) in 60 ml. warm water is added in 1 h. under stirring with 100 g. 5-chloro-methylindane solution in 260 ml. 99% ethanol. The solution is then refluxed for 4 h., alcohol is removed by distillation under reduced pressure; the solution is then extracted with ether (150 ml.×3), washed and dried.

The oily residue after evaporation is distilled and results in 80.5 g. 5-indanyl-aceto-nitrile (boiling point: 115° C./0.8).

(c) 350 g. NaNH$_2$ anhydrous ethereal suspension (obtained from 12.4 g. Na) are stirred and added with 100 ml. anhydrous ethereal solution of 5-indanyl-acetonitrile (80.5 g.) in 30 min. to 1 h.

After 2 hours refluxing 50 ml. ethereal solution of ethylbromide (58.8 g.) are added drop-by-drop and refluxed again for further 6 h. under continual stirring. The solution is allowed to rest till the following day, then cautiously added with 250 ml. water and acidified to Congo-red with 10% hydrochloric acid.

The ether is separated, washed to neutrality and dried and evaporated; the oily residue is eventually distilled, resulting in 66.5 g. α-(5-indanyl)-butyro-nitrile (boiling point: 129° C./0.8).

(d) 140 g. KOH and 66.5 g. nitrile in alcoholic solution (350 ml.) are refluxed for 24 h. After complete distillation of alcohol, the residue is dissolved in water and acidified. An oil separates which is extracted with ether (150 ml.×3) which, after possible decolorization with bone charcoal, is dried and evaporated. The residue oil diluted in petroleum ether, gives white crystals on prolonged cooling and results in 28.2 g. α-(5-indanyl)-butyric acid (M.P. 78–79° C.).

α-(5-indanyl)-butyric acid can be salified with an inorganic base such as NaOH, or with an organic base such as aminoglycerine. If 1-chloro-methyl-indane is used, and a process as per the aforementioned examples is resorted to, α-(1-indanyl)-butyric acid is obtained.

EXAMPLE 2

2-benzofuryl-isobutyric acid (a) A solution containing 15.71 g. (0.1 M) 2-benzofuryl-acetonitrile in 150 ml. anhydrous ethyl-ether is gradually added with 11.7 g. (0.3 M) NaNH$_2$ and refluxed for 2 h. under continual stirring. Heating is then discontinued and 42.5 g. (0.3 M) methyl-iodide are added drop by drop; the solution is then refluxed again for 6 h. and stirred for 14 h. at room temperature. The suspension is cooled, then added with 150 ml. water, acidified with diluted hydrochloric acid; the ethereal extract is separated, the suspension is washed with water to neutrality. The ether is dried, the solvent is evaporated, the residue is distilled resulting thus in 2-(α-α-dimethyl)-benzofuryl-acetonitrile (boiling point: 100° C. at 0.8 mm. Hg pressure).

(b) A solution containing 5 g. 2-(α-α-dimethyl)-benzofurylacetonitrile in 75 ml. diethylene-glycol is added with 5 g. KOH dissolved in 20 ml. water and refluxed for 20 h. The solution is further diluted with 75 ml. water, then washed, with ethyl-ether; the aqueous solution is acidified with diluted hydrochloric acid. The precipitate thus obtained is filtered and crystallized from ligroin resulting in 2-benzofurylisobutyric acid (M.P. 127–130° C.).

Operating in a similar way and starting from 17.32 g. 2,3 - dihydro - 2 - methyl-5-benzofuryl-acetonitrile, 2,3-dihydro - 2 - methyl - 5-(α-α-dimethyl)-benzofuryl-acetonitrile can be obtained (boiling point 115° C. at 0.4 mm. Hg pressure).

Saponification of this drug according to the process detailed in (b) results in 2,3-dihydro-2-methyl-5-benzofuryl-isobutyric acid, which can crystallize from hexane or, in cases when it is obtained as an oily drug, as has occurred for some preparations, is depurated by chromatographic separation through a column, with Merck silicon gel for chromatography (0.05–0.2) used as resorbent and gasoline-acetic acid adopted as eluent (90:10 ratio). White product (M.P. 85–87° C.).

In a similar way 2,3-dihydro-5-benzofuryl-isobutyric acid can be obtained.

EXAMPLE 3

2-benzofuryl-α-butyric acid (a) A solution containing 15.71 g. (0.1 M) 2-benzofuryl-acetonitrile in 150 ml. anhydrous ether is gradually added with 4.1 g. (0.105 M) $NaNH_2$ and refluxed for 2 h. under continual stirring. Heating is then discontinued and 11.35 g. (0.105 M) ethyl-bromide is added with drop-by-drop process. The mixture is refluxed under stirring for 6 h. and stirred again for further 14 h. at room temperature. The suspension is cooled and added with 150 ml. water, acidified with diluted hydrochloric acid, the ethereal extract is separated, washed with water to neutrality. The ether is dried, the solvent is evaporated, and the residue is distilled, resulting thus in 2-(α-ethyl)-benzofuryl-aceto-nitrile (boiling point: 85° C. at 0.8 mm. Hg pressure).

(b) A solution containing 5 g. 2-(α-ethyl)-benzofuryl-aceto-nitrile in 75 ml. diethylene-glycol is added with 5 g. KOH dissolved in 20 ml. water, and refluxed for 20 h., then diluted with 75 ml. water, washed with ethyl-ether. The aqueous solution is acidified with diluted hydrochloric acid, the precipitate thus obtained is filtered and crystallized from ligroin, resulting in 2-benzofuryl-α-butyric acid (M.P. 92–93° C.).

Operating in a similar way and starting from 17.32 g. 2,3 - dihydro - 2 - methyl - 5-benzofuryl-aceto-nitrile, 2,3 - dihydro - 2 - methyl - 5-(α-ethyl)-benzofuryl-aceto-nitrile can be obtained (boiling point: 127–130° C. at 0.6 mm. Hg pressure).

Saponification of the latter drug with a process was detailed in (b), results in 2,3-dihydro-2-methyl-5-benzofuryl-α-butyric acid, which can crystallize from hexane or be depurated by chromatographic separation through a column, as reported in Example 2. A white product (M.P. 79–81° C.). In a similar way 2,3-dihydro-5-benzofuryl-α-butyric acid can be obtained.

TABLE

| Compound | Number of rats | Dose, mg./100 g. | Highest choleresis (in ml./h. 100) |
|---|---|---|---|
| α-(5-indanyl)-butyric acid | 6 | 20 | 28.8±4.2 |
| Do | 6 | 10 | 24.5±3.2 |
| Do | 6 | 5 | 16.3.±2.6 |
| Do | 6 | 2.5 | 11.2±1.9 |
| Dehydrocholine | 6 | 20 | 18.2±5.6 |
| Do | 6 | 10 | 11.8±1.9 |
| Do | 6 | 5 | 6.0±0.6 |
| Do | 6 | 2.5 | 2.0±0.3 |

We claim:
1. α-(5-indanyl)-butyric acid.

References Cited

Oka: Yakugaku Zasshi, vol. 81, pp. 882–8 (1961).

Fieser and Fieser: Advanced Organic Chem., New York, Reinhold (1961), pp. 365–6.

House: Modern Synthetic Reactions, New York, Benjamin Inc. (1965), pp. 187–9.

ALEX MAZEL, Primary Examiner.

B. DENTZ, Assistant Examiner.

U.S. Cl. X.R.

260—340.5, 340.6, 346.2, 999